June 5, 1945. W. J. OSTERHOUDT 2,377,442
VESSEL FOR SUBMARINE NAVIGATION
Filed Nov. 17, 1942 8 Sheets-Sheet 1

Inventor
WALTER J. OSTERHOUDT
By A. M. Houghton
его Attorney

June 5, 1945.　　W. J. OSTERHOUDT　　2,377,442
VESSEL FOR SUBMARINE NAVIGATION
Filed Nov. 17, 1942　　8 Sheets-Sheet 8

Fig. 19.

Fig. 20.
RADIAL STRAND COIL RIGHT LAID
LOCKED STRAND COIL LEFT LAID

Fig. 21.

Fig. 22.
20 INSULATED #18 SOFT COPPER STRANDED CONDUITS
ROUND STRAND STEEL WIRE RIGHT LAID
ROUND STRAND STEEL WIRE LEFT LAID
WOVEN INSULATION, WATERPROOFED
RUBBER OR NEOPRENE INSULATION
WOVEN INSULATION, WATERPROOFED
4 COPPER & STEEL POWER CONDUCTOR

Inventor
WALTER J. OSTERHOUDT
By G. M. Houghton
Attorney

Patented June 5, 1945

2,377,442

UNITED STATES PATENT OFFICE 2,377,442

VESSEL FOR SUBMARINE NAVIGATION

Walter J. Osterhoudt, Houston, Tex.

Application November 17, 1942, Serial No. 465,892

5 Claims. (Cl. 114—235)

This invention relates to improvements in vessels for submarine navigation which are adaptable for use both as a national defense weapon, to rapidly locate, examine, identify and to salvage sunken allied or enemy submarines and other sunken vessels or objects, to locate, pursue and attack enemy underwater craft, or to find and destroy dangerous obstruction as mines and submarine cables and nets, and for such peacetime uses as the location and salvage of sunken bodies, to assist in the rescue of living occupants of trapped submarines, and to recover bodies and objects, and for the geophysical and other exploration of water bottoms.

The submarine as an instrument of war utilizes the fundamental raiding practices of concealment and surprise, in both of which it excels surface craft. Its sound ranging equipment can be more effectively used because of its quieter power, and also because it can lie submerged and quiet when surface vessels are in the vicinity, with small chance of detection by sound locating apparatus. It is, however, relatively slow and cumbersome in underwater maneuvering.

In its peacetime use the submarine offers a means for the examination and salvage of sunken ships and for undersea explorations. These uses while heretofore appreciated have not reached practical attainment because of the great initial cost of a submarine vessel and its cost of operation as compared with that of diving equipment lowered from the surface.

Especially in the field of undersea exploration the submarine possesses the advantage that, as a self-contained laboratory, it furnishes stable support for the delicately responsive instruments used in explorations, and it is capable of movement under control of the operator to different localities.

In the interest of lower initial cost, increased maneuverability, and greater facility in quickly transporting the vessel to its field of operations my invention has for its principal object the provision of a small, high speed submersible which may be carried on the deck of a mother craft, or towed on the surface to the region where its underwater use is desired, whereupon it may submerge and range around the mother craft within the length of its connecting cable by power supplied therethrough from the mother craft, or it may be cast off by control of the submarine pilot and thereafter proceed under its self-contained auxiliary power independently of the mother craft.

A further object of the invention is to provide a small submarine vessel of hull shape intended in the main for underwater operation, but modified at the bottom for easy movement upon the surface under tow, by the selective adjustment of planing skids under control of the operator.

Other and further objects and advantages will be apparent from the following description and drawings, in which.

Referring more particularly to the drawings:

The submarine vessel

The submarine vessel comprises a hull, the upper part 20 of which is contoured, as shown, in streamline shape (following known principles) to offer minimum resistance when submerged. The bottom 21, however, resembles a speed boat bottom, being flat as at 22 (Figure 5), of shallow V-section and having a step 23. A pair of planing skids 24 are pivoted at 25 adjacent the step and are adapted to be moved to either the retracted position of Figures 2 and 6 or the extended position of Figure 5 by hydraulic jacks 26 from within the vessel hereinafter to be described in detail. In the lower or extended position of Figures 1 and 5 the skids form in effect prolongations of the under hull and serve to let the vessel glide or plane under tow. With moderately high towing speeds, say above 20 or 25 knots, the planing effect is sufficient to bring the propellers clear of the water thereby reducing drag. In the upper or retracted position the skids lie flush with the hull and are without effect.

The vessel is provided with a keel 27, of depth increasing aft and interrupted by an auxiliary rudder 28 (Figure 2); also a steering rudder 29 and an elevator rudder 30 arranged as shown adjacent the twin propellers 31. Two principal diving planes 32 of roughly triangular shape are provided slightly forward of amidships as shown. Each diving plane is mounted for rotation about a horizontal axis under control of the submarine pilot, and each carries an auxiliary motor 33 for driving a propeller 34 within a cutout portion 35 of the plane. The vessel is provided with a hatch 36, lifting rings 37, a hinged gill tube assemblage 38 (for access of air when the submarine is idling just below the surface), a locker 40 for emergency-phone line and buoy 41 (of known type) and a pair of small torpedo tubes 42.

Figure 2:
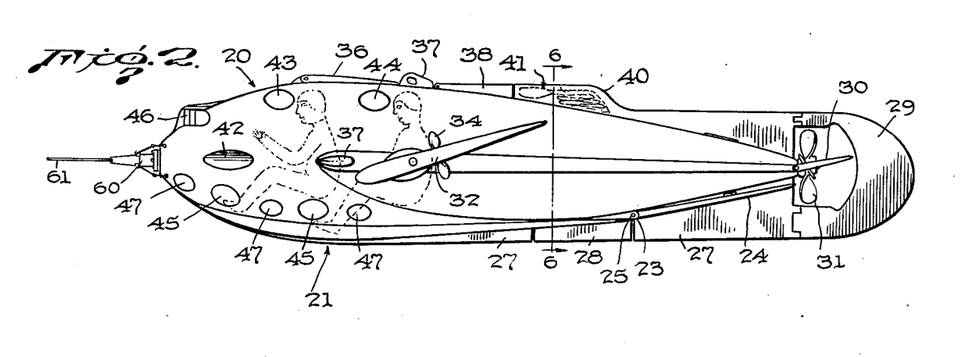
Figure 2 is a view of the submarine in side elevation.

The operators sit as indicated diagrammatically in Figure 2 and can see out of the upper windows 43 and 44 and lower windows 45; a head lamp 46 and lower lamps 47 are provided to illuminate the depths.

At the bow is located a cable connecting device 60 hereafter to be described in greater detail, which serves for attachment of a combined tow and power cable 61 which leads to the mother ship.

Ordinarily the mother vessel 70 is a large speed boat or small destroyer of known types, of length say seventy-five or eighty feet or greater and capable of speeds (while pulling the submarine) of thirty to forty knots. It serves as a power source for the driving motors, lights, pumps, etc. of the submarine while the latter is being towed, although the submarine contains storage batteries which constitute an auxiliary power source when the latter ranges as an independent vessel.

The tow cable 61 passes inboard of the mother craft over shock absorbing sheaves 75 which are carried by a davit 76, rotatable through 180° (aft) by power means 77. These sheaves lead the cable onto a winch 78. Thus through controls on the mother craft or on the submarine (or both) the towing cable may be payed out or reeled in as desired and the submarine may, as occasion demands, be pulled up on to the aft deck of the mother craft up a temporary, inclined platform lowered over the stern or be lifted bodily over the sides by means of the lifting rings. In this way the small submarine can be quickly transported to its field of operations either by being towed on the surface or by being carried on the deck of the mother craft.

Figures 3, 4:
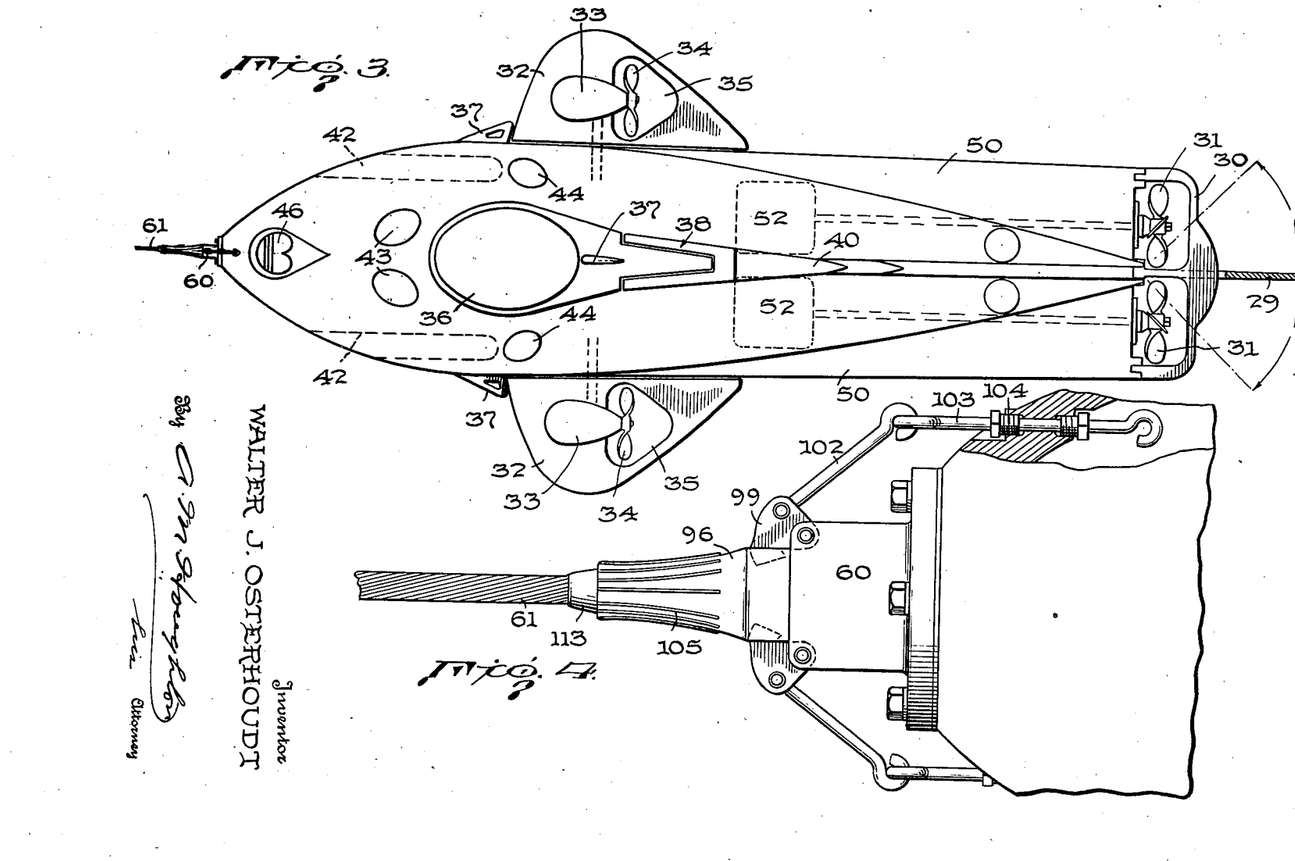
Figure 3 is a top plan view.
Figure 4 is an enlarged view of the cable clamp and connector, showing the releasable connection for operation by the submarine pilot.

Several pairs of compartmented air-water ballast chambers 50 controlled by pumps in a way known per se are provided in the amidships and inside the forward part of the vessel as shown partially in Figure 3.

The propellers 31 are driven by electric motors 52 indicated diagrammatically in Figure 3 which derive their power from the mother ship through the tow cable but which, as above stated, may run on the auxiliary power supplied by storage batteries within the submarine itself. These motors may be much larger proportionately in power and in weight than is possible in conventional submarines since the principal source of power is external to the vessel. Stability is increased by driving the propellers in opposite directions, although the illustration of twin screws is not to be understood as limiting the invention to that form of propulsion.

The stern planing skids

Figures 5, 6, 7:
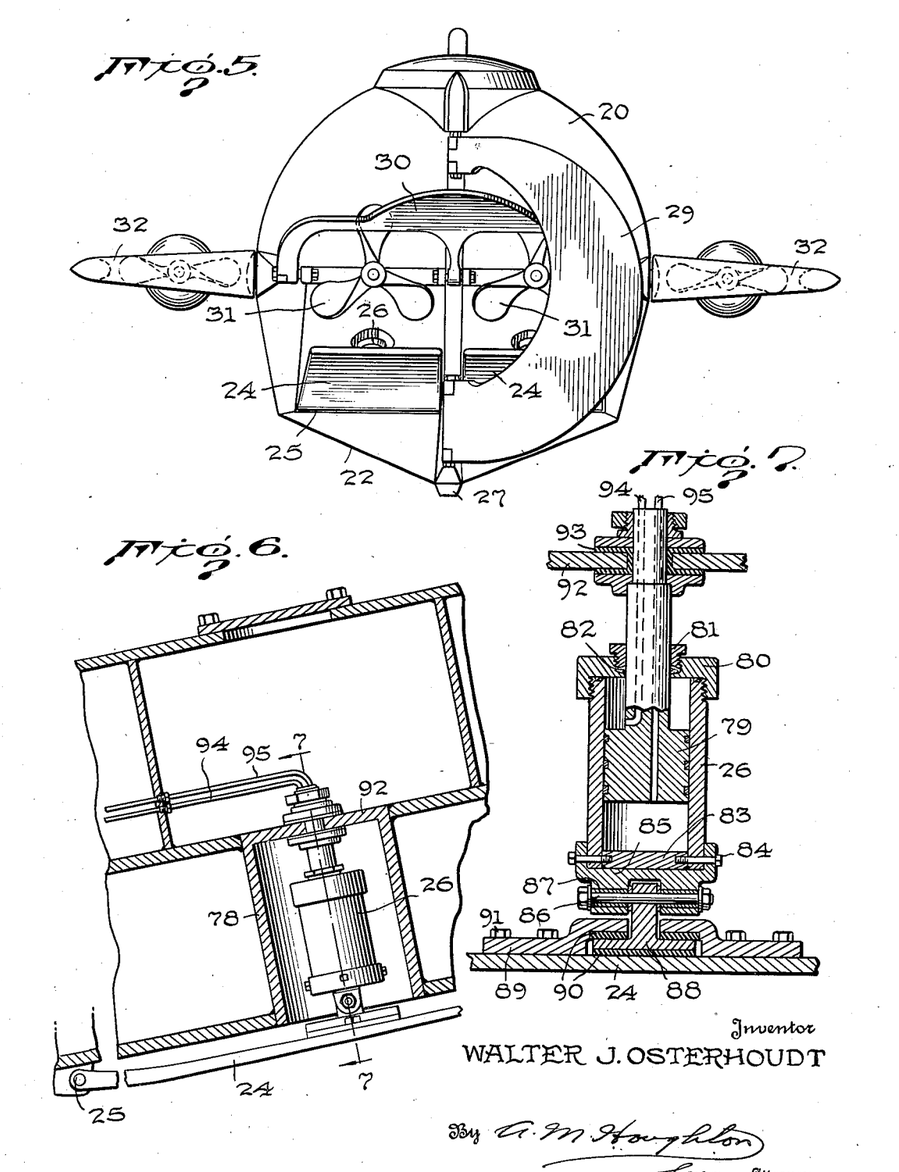
Figure 5 is a rear elevation of the submarine.
Figure 6 is a vertical view, partly in section, showing the hydraulic jack mechanism for raising and lowering the planing skids adjacent the under stern of the submarine.
Figure 7 is a vertical sectional view taken along the line 7—7 of Figure 6, showing in detail the hydraulic jack mechanism for raising and lowering the planing skids.

The stern planing skids 24, as shown in Figures 5 to 7, inclusive, are hinged at 25 and are moved to upper and lower positions by hydraulic jacks 26 mounted within wells 78 which extend into the body of the submarine.

Each hydraulic jack comprises a cylinder within which a piston 79 is mounted for reciprocation, the piston extends through a head 80 threadedly received on one end of the cylinder and provided with a gland nut 81 which compresses packing 82 about the piston stem to prevent leakage. In its other end the cylinder is fitted with a disk closure 83 which may be welded in place and additionally secured by bolts 84. These bolts also serve for the attachment of a cap 85 on the end of a cylinder such cap being formed with spaced downwardly extending lugs which have coaxial bores to receive a bolt 86 mounted in a rubber bushing 87 for the pivotal support of a foot 88. Flange plates 89 overlie the foot 88 and interposed rubber buffers 90, these flange plates being secured to the planing skid 24 by bolts 91.

The fixed stem of the piston 79 extends through the shell 92 of the submarine through a watertight bearing which comprises a rubber packing 93 compressed and held to surround the piston closely. Pipes 94 and 95 conduct hydraulic fluid to conduits which extend through the piston stem and terminate respectively above and below the head of the piston. Thus, by forcing hydraulic fluid through pipe 95 into the chamber below the piston head the cylinder 26 is forced downwardly carrying the planing skid 24 to its extended position. When it is desired to retract the skid, fluid is admitted through pipe 94 above the piston head thereby retracting the cylinder and pulling it up into the well 78. Shock is absorbed at the extreme limits of the skid movement by the rubber bushing and the buffer 90 in the connections between the skid and jack.

Cable clamp and connector

The cable 61 has quick releasable connections at its opposite ends to establish power communications between the submarine and its mother craft. Since these are of the same construction a description of one of them will suffice.

A male coupling member 96, formed with an annular shoulder 97, is received within a socket 98 which is mounted on the bow of the submarine and, in its interfitting position, is retained therein by bolt elements 99 which have inwardly and rearwardly directed locking projections 100 engaging in complemental keeper recesses in the male connector. The bolts 99 are hingedly mounted on the socket 98 by transverse pins 101 and are swung to locking or released position by rods 102 which, as shown in Figure 4, connect with trigger rods 103, passing through packing glands 104 for operation by the pilot of the submarine.

Figures 8, 9, 10:
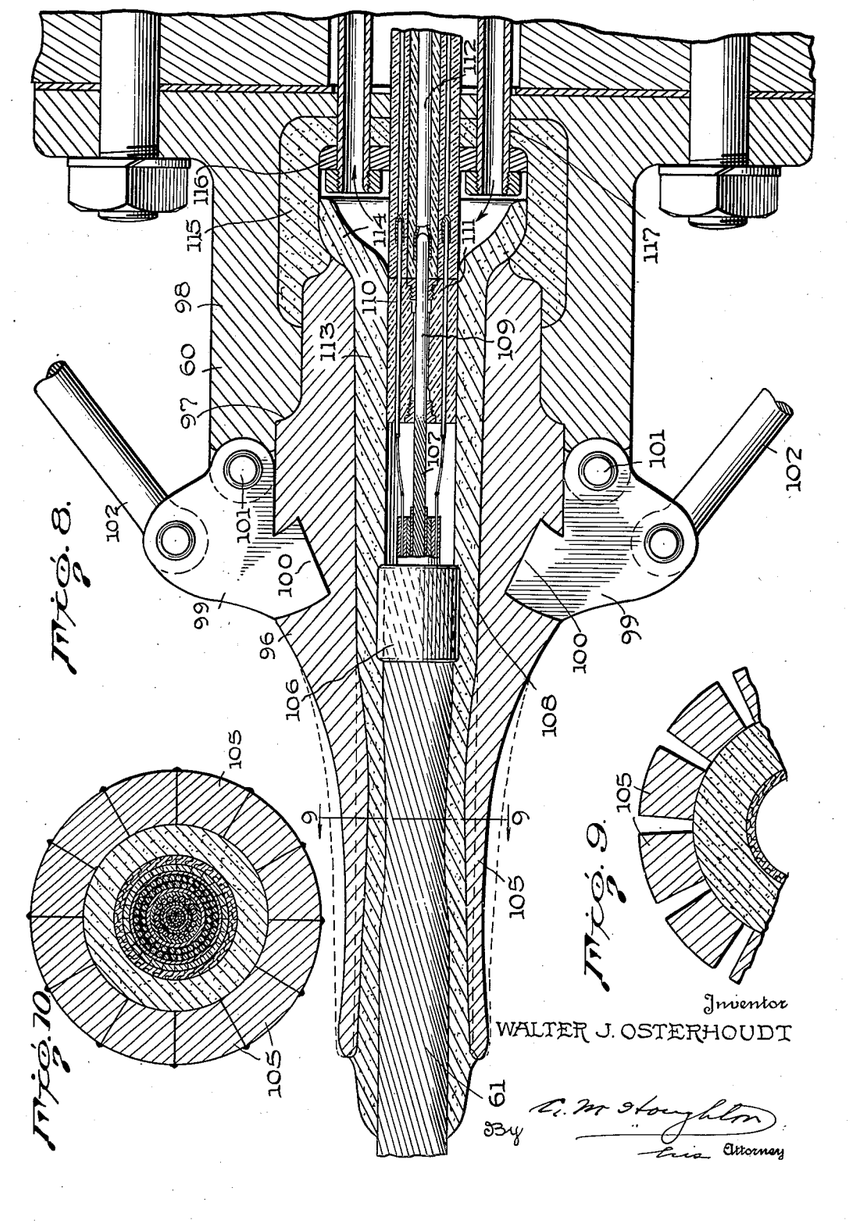
Figure 8 is an enlarged cross section of the cable clamp and connector.
Figure 9 is a transverse sectional view through the coupling to the connector sleeve showing the fingers in position before clamping pressure is applied.
Figure 10 is a sectional view similar to Figure 9 showing the cable fingers clamped on the cable and welded in position.

The male connector 96 is of tapering conformation outwardly along the cable as is shown in Figures 8 to 10, inclusive. Its tapering end is formed with a plurality of spaced fingers 105 so formed that when the male connector is in place the fingers 105 are compressed and sealed by welds about the cable, thus bringing them into abutment and tightly gripping the cable.

Adjacent its end the cable 61 has a clamping collar 106 compressed upon it, and beyond this the power conductor 107 and the smaller conductors 108 are supplying telephone communication, detecting apparatus, gauges, pumps, etc. are exposed and connected, respectively, to prongs 109 and 110 which are secured in a micarta or Bakelite plug 111. The exposed portions of the conductors leading from cable to plug 111 are coated with a suitable insulating composition such as Bakelite varnish and taped. The plug 111, additionally, is formed with two or more unobstructed channels (not shown) for the purpose of filling the space around the exposed conductors with oil insulation in manner hereinafter to be described.

The conductor prongs 109 and 110 are received in sockets in the member 112 for the establishment of the various electrical circuits within the submarine. The plug 111 is retained in a closely fitting sleeve 113 of neoprene or other oil-and-water resistant rubber. This sleeve extends beyond the end of the male connector 96 and terminates in a flaring bell mouth as shown at 114 to fit closely within a cup 115 of similar material which is retained within the socket 98 by a plate 116. Four pipes 117 (two of which are shown in Figure 8) extend through the shell of the submarine and into the space within the neoprene cup 115. Their screw threaded ends receive nuts 118 which bear against the retaining plate 116 and hold the assembly in position. The sleeve 113 extends along the cable to a point beyond the clamping fingers 105 which, when contracted by constricting pressure, compress the neoprene sleeve closely around the outer wrappings of the cable 61 to grip it firmly and to impress it upon the collar 106 and the plug 111.

One of the pipes 117 supplies high pressure oil from an interior hydraulic pump to the space within the socket. Another pipe supplies compressed air from an interior air tank to the socket. A third pipe is a scavenger line carrying unwanted mixtures of oil, water and gas back to the submarine where they may be ejected. The fourth pipe finally returns clean oil from the socket to a separator which eliminates the water and returns clean oil to the hydraulic line for circulation. The flow of fluid and air to and from the socket is controlled by manually operated valves inside the submarine.

In making the cable connection the bolts are held retracted and the male cable connector is inserted into the socket in the position shown in Figure 8. The bolts are then swung to locked position. In this position of the connector the belled mouth 114 of the rubber sleeve is forced beyond the shoulder at the junction of the flexible cup 115 with the end of the male connector element. The bell-like mouth of the rubber sleeve having passed the constricted flexible lip of the cup expands to fill the inner periphery of the cup and, under pressure, the two surfaces are forced tightly together to provide a leak-proof seal.

When the connection is first made the space within the socket may be filled with water or it may contain dirt and other conductive material. In order to clear the space so that electrical connection can be established the valves of the scavenger line are operated inside the submarine and first air and then oil are blown alternately into the socket. This pressure reaches back to the space surrounding the exposed conductors 107, 108 through the ducts previously described so that such space is also flushed out. By the process of blowing alternately with air and flushing with oil foreign materials are expelled from the cup and connections. Thereafter clean oil is pumped into the cup and maintained there under high pressure. When the operator has cleared the connector in this manner he may test the resistance across the terminal panel to ascertain that no leakage exists between the several conductors, following which the power and auxiliary circuits are switched on.

When it is desired to release the tow line connection the submarine pilot shuts off the power circuits and retracts the trigger levers 103 thereby swinging the bolts rearwardly about their pivots 101 whereupon the male cable connector is blown free by the force of the oil pressure in the joint.

In assembling the connector the end of the cable 61 is passed through the stainless steel male conector 96, the fingers 105 of which are initially expanded. Next, a tight fitting sleeve of neoprene or other water resistant yieldable material is forced over the cable and slid back from its end to expose the region to which the collar or sleeve 106 is thereupon applied and pressed tightly to grip the cable. The compression of this collar should exceed 1000 pounds per square inch. Beyond the collar 106 the outer layers of cable are removed to expose the inner, insulating layers and various conductors which are then soldered to the prongs 109 and 110 carried by the plug 111. All exposed wire and metal parts are then given several coats of Bakelite insulating varnish and are adequately taped.

The molded neoprene sleeve is thereupon slipped forwardly to a position where its bell-like mouth 114 is closed by the plug 111. Finally the fingers 105 are compressed under hydraulic pressure of several thousand pounds per square inch to the full line position shown in Figure 8, at which position the fingers are welded together to prevent subsequent separation. Because the compression is made uniformly from the outside to the center of the cable there is a uniform squeezing of the tow-line thereby eliminating sharp bends or potential breaking stress points, and since the sleeve extends beyond the rounded ends of the fingers 105 abrasion and sharp bending of the tow line is avoided at this point.

Thus, by the use of the cable clamp and connector of this invention a connection may be made in fresh or salt water and cleaned for the establishment of electrical circuits within a period of a few seconds. When it is desired to release the tow cable this may be accomplished in a fraction of that time.

The cable connection is not restricted to use for towing a submarine but is equally adaptable to such apparatus as diving bells, salvage and rescue equipment, under water gravimeters and other geophysical apparatus. It may also be used to sustain elevators or mine cages in which use it would have special advantage in that the weight sustaining cable itself carries the power line.

The towline cable

Figures 19 to 22, inclusive, illustrate details of two possible types of the combined towline and power cable which is designed for great tensile strength while at the same time serving to establish electrical communication between the submarine and its mother craft.

Figure 21:
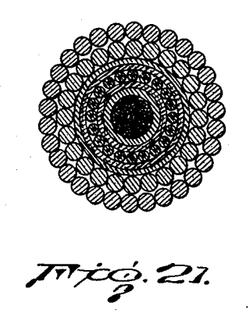
Figure 21 is a sectional view through the cable core.
Figure 22:
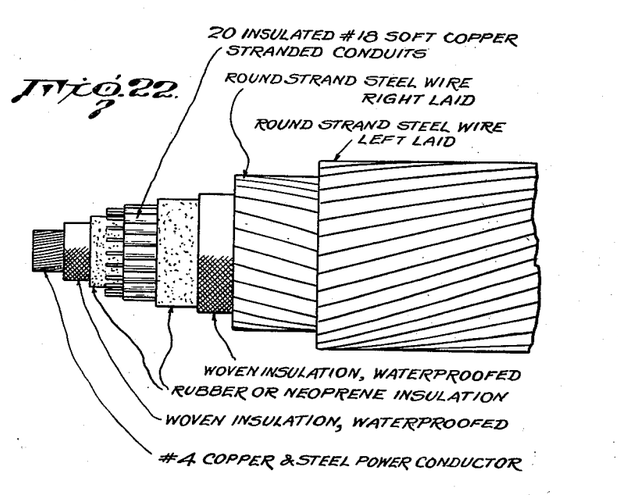
Figure 22 is a side elevation of the power conductor which forms the core of the cable.

A heavy copper and steel power conductor constitutes the core of the cable. Successive layers of woven insulation and rubber or neoprene insulation surround this core. A plurality of smaller, individually insulated conductors are arranged around the core and are themselves enclosed in successive plies of rubber and waterproof woven fabric. This assemblage of conductors and insulating materials is retained within successive plies of abutting round strand steel wire which are respectively right laid and left laid.

Figures 19, 20:
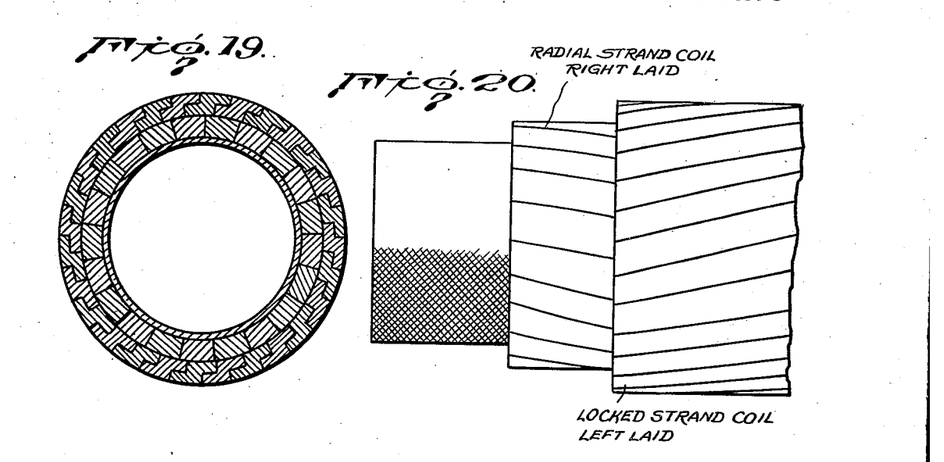
Figure 19 is a vertical sectional view taken through the outer plies of the cable.
Figure 20 is a side elevation showing the outermost plies of the cable.

To impart the necessary tensile strength to this power cable, in order to adapt it for towing purposes, the outer plies which surround the conductor comprise, in radially outward direction, a woven sheath, a radial strand coil which is right laid with the strands in abutting relationship, and finally a locked strand coil which is left laid. The entire assemblage including the conductor constitutes the towing cable.

Cable shock absorber

Figures 13, 14, 15:
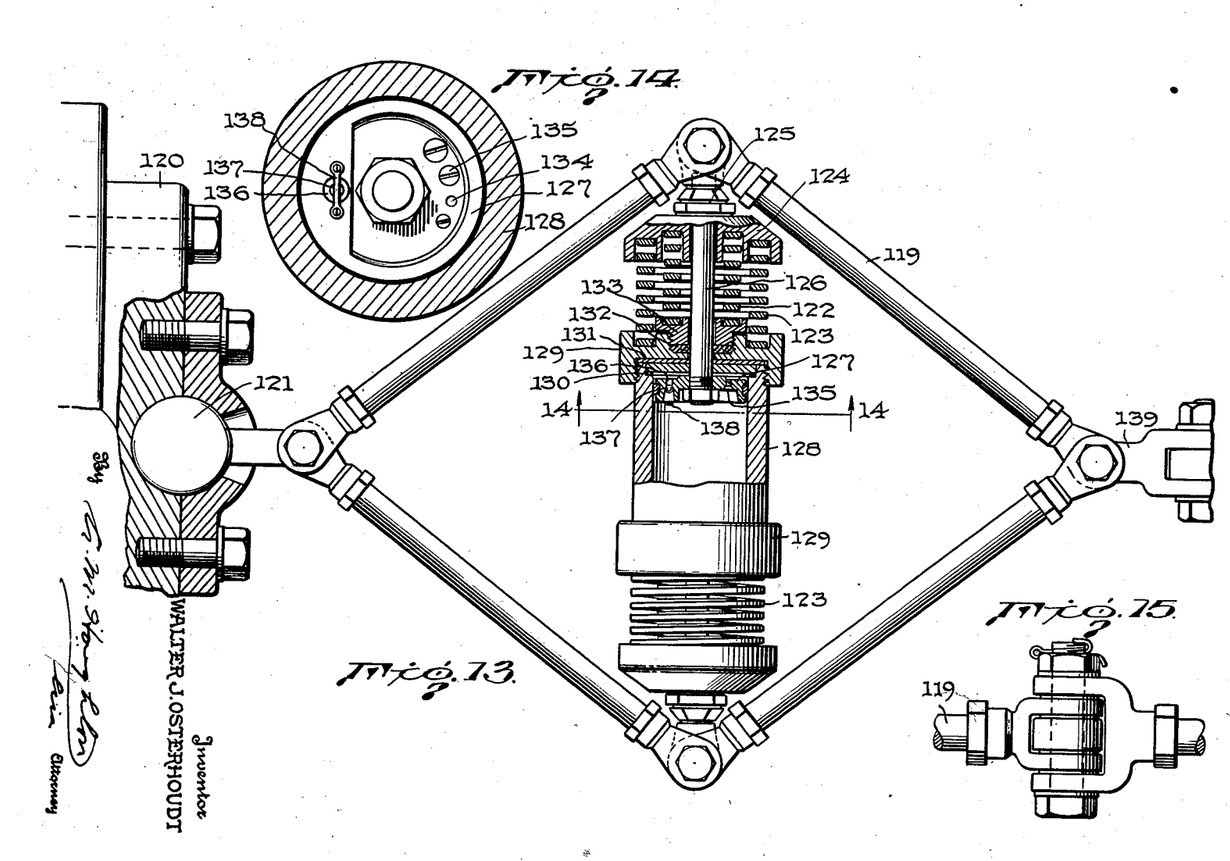
Figure 13 is a plan view, partly in section, of one of the shock absorbers, showing its attachment to a davit or other support.
Figure 14 is a sectional view along the line 14—14 of Figure 13.
Figure 15 is a detail view of the pivotal connection between the arms of the shock absorber unit.

The cable shock absorber shown in Figures 13 to 15 inclusive comprises a toggle 119 which is secured to some support such as a davit 120 by a ball and socket connection 121 so formed as to permit the toggle to pivot freely in all directions.

The links of the toggle are pivotally connected by pin-and-clevis connections shown in detail in Figure 15 and are held separated by concentric pairs of springs 122 and 123, the springs of each pair being right and left hand wound, respectively, to reduce any tendency to twist the assembly. The outer ends of these springs seat in annular grooves of a cap 124 which abuts a shoulder 125 on piston rod 126. The rod 126 carries a piston 127 reciprocable in a floating cylinder 128, each end of which is enclosed by a screw threaded head 129 which compresses a copper gasket 130 against an internal shoulder in the wall of the cylinder adjacent the end. A rubber or neoprene packing 131 seals the cylinder at its end with the assistance of packing 132. The gland nut 133 which retains the packing is found with an annular groove in which the coil spring 122 is seated.

The cylinder 128 contains air or oil of selected viscosity which, in travel of the respective pistons toward each other, passes through a dashpot opening 134 in each piston to check its movement and to supplement the retarding action of the springs 122 and 123. A series of such ports 134 of graduated size may be suitably provided and all but the one which is of a size for most efficient action with the dashpot fluid used and the load applied are then plugged as by screws 135.

For free retraction of the pistons when load tending to compress the toggle is relieved each piston has another port 136 in which a ball check valve 137 is retained by a cage 138. The port 136 flares outwardly toward the face of the piston whereby, as the pistons approach each other when the toggle is compressed in lateral direction, the ball valve 137 closes the port 136 and all fluid passing the piston is required to flow through the dashpot passage 134. Upon retraction of the piston when the load is released and the toggle resumes its normal extended position, the pistons are retracted and the respective ball valves 137 open to permit the free passage of the fluid into the space therebetween.

Along its longitudinal axis the toggle is connected at one end for angular movement and rotation, as previously described, by means of a ball and socket joint. At its opposite end it is connected by clevis 139 to a drawbar, sheave or other means to which a load is applied.

Cable winch

Figure 1:
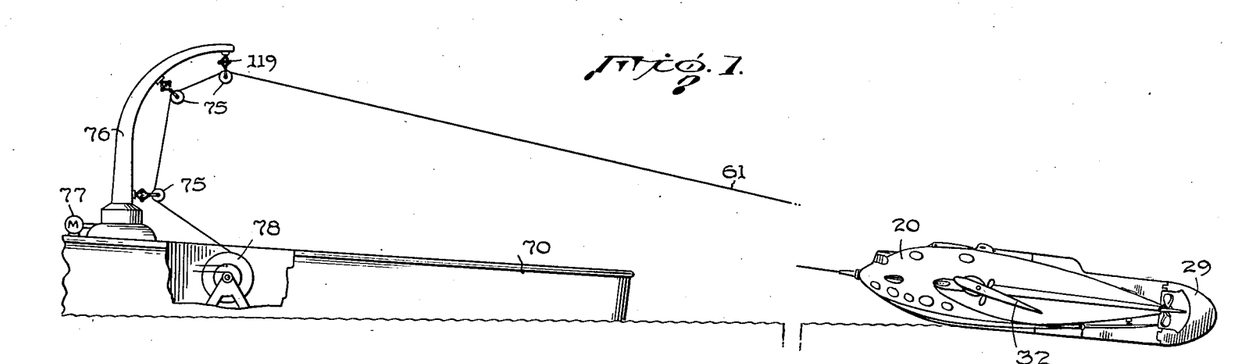
Figure 1 is a diagrammatic view showing a submarine according to the invention in tow on the surface.
Figure 11:
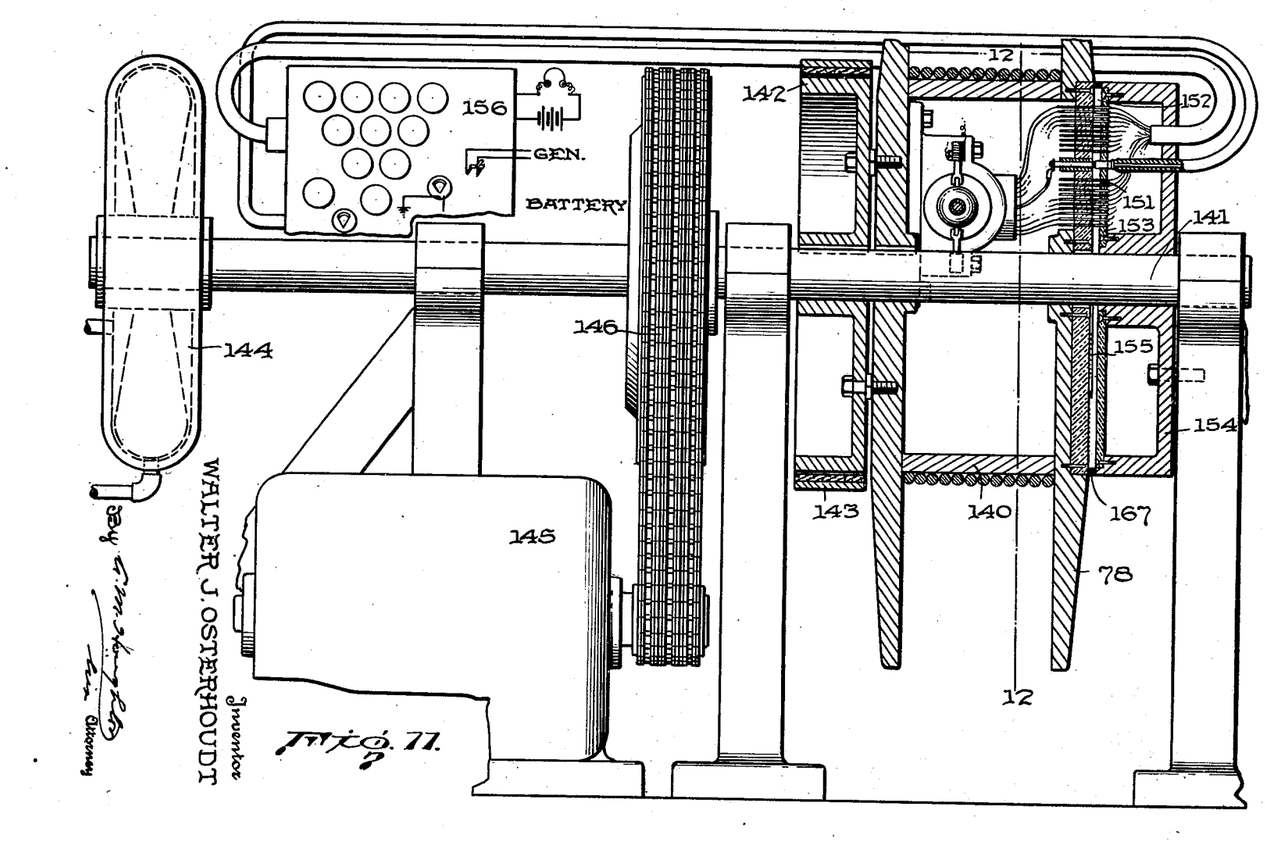
Figure 11 is a plan view, particularly in section, showing the cable winch and commutator.
Figures 12, 16, 17, 18:
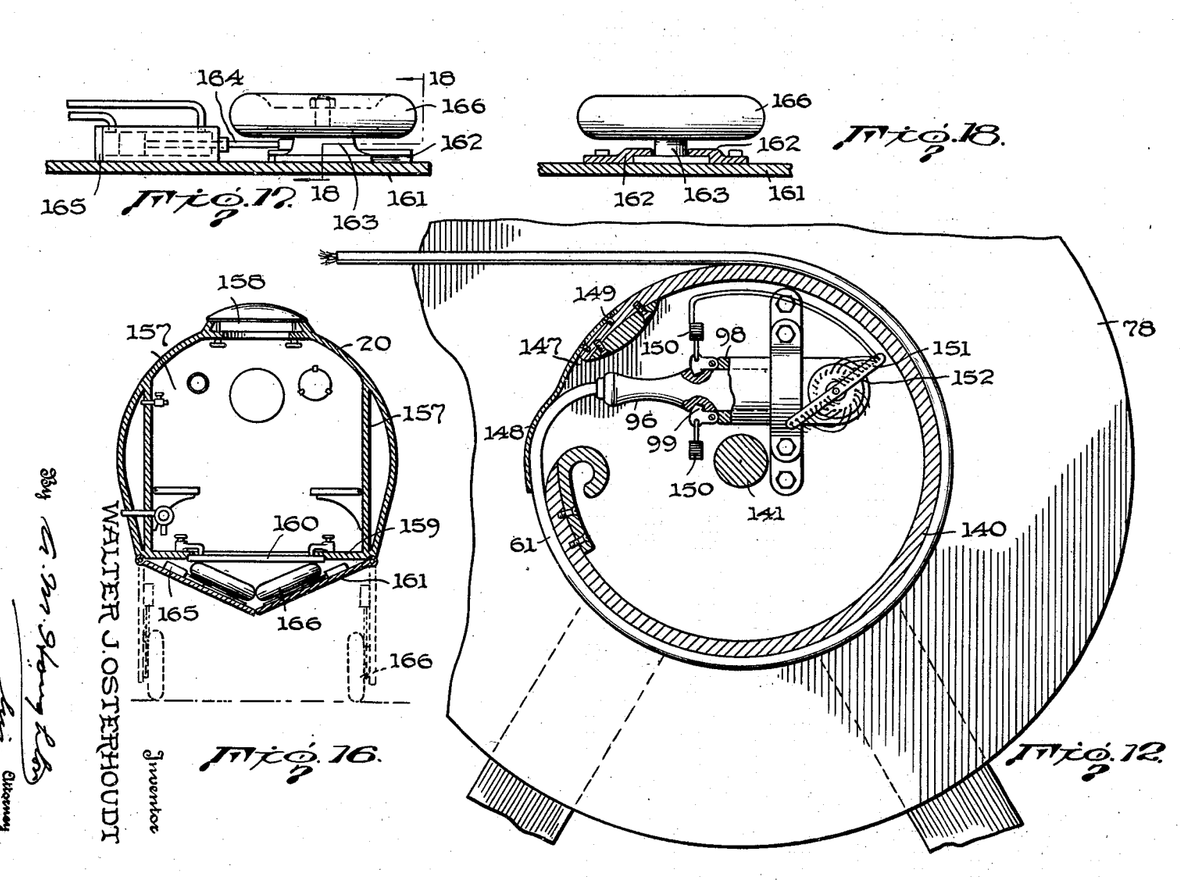
Figure 12 is a vertical sectional view taken along the line 12—12 of Figure 11.
Figure 16 is a vertical sectional view showing a modified form of a submarine adapted particularly for exploration of water bottoms.
Figure 17 is a detail view of the wheel mounting shown in Figure 16, with hydraulic operated means for extending and retracting the wheels.
Figure 18 is a view taken along the line 18—18 of Figure 17.

The cable winch 78, as shown in Figures 1, 11 and 12, comprises a drum 140 splined to a driving shaft 141 and carrying a brake drum 142 which has a brake band 143 to control rotation of the drum in paying out cable. A Parkersburg type hydromatic brake 144 is also secured to shaft 141.

Rotation of the drum shaft for reeling in cable is accomplished by motor 145 through appropriate chain drive and gearing 146.

As shown in Figure 12 the winch hub is formed with an opening 147 the edges of which are rounded to avoid sharp bending and abrasion of the towline cable 61. This opening is closed by a flap 148 of flexible material which is secured to the drum 149 and serves to protect the electrical connections inside the drum hub from water and dirt. A cable clamp 96, similar to the one previously described, is received and retained in a socket 98 for quick release and withdrawal of the latches 99 when solenoids 150 are energized. Through a multiple prong plug and cooperating socket such as heretofore described connection is established between the conductors of the cable and the terminals 151 carried by an arm 152 of insulating material. An annular disk 153 (Figure 11) of insulating material is secured to a fixed housing 154 adjacent the end of the winch drum through which terminals 151 extend and it carries a concentric series of commutator rings 155 to establish the various electrical circuits between the rotating winch drum and the fixed support. A felt packing 167 seals the joint between the two. An instrument and control panel, indicated generally at 156, conveniently groups the controls for the various circuits for communication, propulsion of the towed craft, light, and other necessary functions.

An important feature of my invention is the provision of a drum of relatively large diameter and small width as contrasted to conventional winches which have small diameter drums with flanges set widely apart. In the prior type drum the small diameter causes sharp flexing of a cable wound thereon. Bad spooling difficulties which result from use of such a drum are likely to crush and break the cable strands and to wear out the cable on the drums making it frequently necessary to discard the first drum layer of a cable before its service end is appreciably worn. Difficulty is also experienced with conventional drums because it is often impossible to set the first sheave sufficiently far from the long drum to maintain the proper fleet angle, this being defined as the angle between the cable and a line drawn through the centers of the sheaves and the winch drum, an angle which should approximate 1° 30″. With the shorter drum of this invention the towline will spool and unspool evenly and smoothly without the use of winding guide and, because of its relatively large diameter, the cable will not sharply bend as it passes onto the drum. Furthermore the short drum permits closer mounting of its journal bearings and a correspondingly shorter shaft, a feature of advantage where the winch assembly is mounted parallel to the beam of the towing craft and in the region of its stern.

Although my invention is not restricted to the relative dimensions of drum and flanges the approximate desirable specifications are:

| | | |
|---|---|---|
| Overall diameter of winch | feet | 4 |
| Diameter of drum | do | 2 |
| Width between flanges | inches | 9 |
| Depth of spooled cable on drum | do | 10.5 |
| Margin between spooled cable on drum and edges of flanges | inches | 1.5 |

A winch of the above dimensions will spool about 1514 feet of 0.75 inch diameter cable. By locating the winch about 12 feet from the bottom of the davit as shown in Figure 1 the cable leads onto the drum at approximately the recommended fleet angle of 1° 30′.

*Modification for exploration*

In Figure 16 there is shown a modified arrangement and construction which adapts the submarine of this invention to exploration, wherein the hull 20 has a separate compartment defined by bulkheads 157, which is accessible through hatch 158. The deck 159 has an opening which is normally closed by a hatch 160, and sealed by being drawn up tightly by conventional screw clamps. In the region of this opening a pair of hinged doors 161, which may be raised or lowered by hydraulic means (not shown), and which in normally raised position lie flush and conform with the under surface of the hull.

A pair of Z-shaped trackways 162 on the inner surface of each door retain and guide the laterally extending flanges of a stub shaft 163. Through direct connection of the stub to a piston 164 which operates in cylinder 165 the wheels 166 may be retracted to the full line position of Fig. 16 wherein they assist in securing the hatch 160, or they may be projected along their respective trackways under hydraulic pressure when the doors are in the dotted line, downward position to permit the submarine to roll along the bottom as it is moved from place to place in geophysical prospecting or other underwater exploration, or in its use as a salvage vessel.

From the foregoing it will be apparent that this invention provides a submarine vessel which may be of large power-to-weight ratio, which may be transported rapidly to the scene of its operations, and which may operate either from a remote power source or, under self-contained power, it may range independently; the several advantages result from its embodiment of the novel features herein described in detail, although it is to be understood that they are, individually, susceptible of other uses as well.

What I claim is:

1. A submarine vessel comprising a hull of rounded cross-section, rounded at the bow and tapering at the stern, the bottom of which is of shallow V-section terminating in a step forwardly of the stern so as to pass freely adjacent the surface of the water under tow, the hull elsewhere being contoured for ready passage through water when submerged, propellers and motors for driving said vessel, means for supplying the motors with energy from a remote point, vertically movable and horizontally movable rudders on the hull and control means therefor, within the hull.

2. A submarine vessel comprising a submersible hull provided adjacent its bow with releasable tow-and-power cable attachment means, a tow-and-power cable attached thereto, means for securing and releasing the same from within said hull, propellers for driving said vessel, driving motors for operating said propellers, controller switch means in electrical circuits with the motors and the tow-and-power cable, planing skid means on the under surface of the hull adjustable about a horizontal axis between a down position such as to cause planing of the hull under tow and an up position such as not to interfere with straight-line movement of the hull when submerged, and power-operated jack means controllable from within the hull for moving the skid means from one position to the other.

3. In combination, a submersible vessel having a tapered hull of rounded top cross-section and shallow V-bottom terminating forwardly of the stern in a step, hinged planing skid means mounted in the recess formed in the hull by said step, a re-entrant well formed in the hull and opening into said recess, a hydraulic cylinder and piston received within the well and supplied with hydraulic fluid from within the vessel, one of said parts being hingedly connected to the planing skid means to raise and to lower the same from a retracted position against the hull and to secure the same in extended position for planing the hull and trimming the vessel in surface navigation.

4. In combination, a submersible vessel so constructed as to be towable over the surface of the water, means for propelling the same under self-contained power, means for switching from self-contained power to an external power source, a towline cable releasably attached to the submersible vessel and connecting with a mother ship which constitutes the external power supply, means on the mother ship for reeling in and paying out the towline cable, and a pivoted boom associated with said reeling means having means for reeving said towline cable thereover, whereby the towline cable is guided onto the reeling means in all angular positions of the towed submersible vessel with respect to the mother ship.

5. In combination, a submersible vessel having a tapered hull of rounded cross-section and shallow V-bottom terminating forwardly of the stern in a step, hinged planing skid means mounted in the recess formed in the hull by said step, power operated jack means for swinging said planing skid means downwardly from a retracted position against the hull and to secure the same in extended position for planing the hull, said power operated jack means comprising a fixed piston extending through the hull and into a re-entrant well formed therein, a cylinder reciprocable with respect to the piston, a shoe pivotally carried by the cylinder and a slidable connection between said shoe and said planing skid means.

WALTER J. OSTERHOUDT.